US012541252B2

(12) United States Patent
Matsuoka (10) Patent No.: US 12,541,252 B2
(45) Date of Patent: Feb. 3, 2026

(54) DISPLAY CONTROL APPARATUS FOR MIRROR DISPLAY, DISPLAY CONTROL METHOD, AND STORAGE MEDIUM (71) Applicant: CANON KABUSHIKI KAISHA, Tokyo (JP)

(72) Inventor: Masaaki Matsuoka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/783,479

(22) Filed: Jul. 25, 2024

(65) Prior Publication Data
US 2025/0068236 A1 Feb. 27, 2025

(30) Foreign Application Priority Data

Aug. 25, 2023 (JP) ................. 2023-137398

(51) Int. Cl.
G06F 3/01 (2006.01)
(52) U.S. Cl.
CPC ................... G06F 3/013 (2013.01)
(58) Field of Classification Search
CPC ..................................................... G06F 3/013
See application file for complete search history.

(56) References Cited

U.S. PATENT DOCUMENTS

| 11,819,108 B2* | 11/2023 | Mouizina | H04N 5/272 |
| 2013/0145272 A1* | 6/2013 | Boggie | G06F 3/017 |
| | | | 715/728 |
| 2017/0053456 A1* | 2/2017 | Cho | G06F 1/163 |
| 2019/0146128 A1* | 5/2019 | Cao | G06F 3/011 |
| | | | 359/838 |
| 2020/0372878 A1* | 11/2020 | Kim | G09G 5/37 |
| 2022/0006950 A1* | 1/2022 | Wang | G06V 10/443 |
| 2024/0265915 A1* | 8/2024 | Trehan | G16H 40/67 |

FOREIGN PATENT DOCUMENTS

| JP | 2007-166548 A | 6/2007 |
| JP | 2015-210509 A | 11/2015 |
| JP | 2021-153918 A | 10/2021 |
| JP | 2021-153919 A | 10/2021 |

* cited by examiner

Primary Examiner — Mihir K Rayan
(74) Attorney, Agent, or Firm — Carter, DeLuca & Farrell LLP (57) ABSTRACT There is provided a display control apparatus. A mirror is configured to project an optical reflection image onto a front surface thereof and transmit light from behind the mirror. A display is disposed behind the mirror. An image sensor shoots a field of view on the front surface side of the mirror. A controller controls a display state, in the display, of an image acquired by the shooting, based on a state of a user on the front surface side of the mirror.

16 Claims, 7 Drawing Sheets

DISPLAY CONTROL APPARATUS FOR MIRROR DISPLAY, DISPLAY CONTROL METHOD, AND STORAGE MEDIUM

BACKGROUND OF THE INVENTION

Field of the Invention

The present invention relates to a display control apparatus, a display control method, and a storage medium.

Description of the Related Art

Conventionally, mirror displays that are able to display regions that are difficult to view with only an optical mirror are known. Japanese Patent Laid-Open No. 2007-166548 discloses a technology that provides the function of a three-sided mirror by displaying video captured by cameras disposed on the left and right of an optical mirror. Japanese Patent Laid-Open No. 2021-153918 discloses a technology that provides a function for displaying full-body images or the like by displaying video captured by a camera disposed in an upper portion of an optical mirror.

The technologies of Japanese Patent Laid-Open No. 2007-166548 and Japanese Patent Laid-Open No. 2021-153918 require a user to instruct the display form of the display by operating an operation unit such as a button. There are, for example, times when the user is holding something in his or her hand when brushing his or her teeth or putting on makeup, or times when the user is holding a bag or the like in his or her hand when he or she wants to check his or her attire, and thus it is troublesome for the user to be required to operate a button or the like.

SUMMARY OF THE INVENTION

The present invention has been made in view of such situations, and provides, in an apparatus that includes a mirror and a display unit, a technology for reducing the burden on a user relating to controlling a display state of the display unit.

According to a first aspect of the present invention, there is provided a display control apparatus comprising: a mirror configured to project an optical reflection image onto a front surface thereof and transmit light from behind the mirror; a display disposed behind the mirror; an image sensor configured to shoot a field of view on the front surface side of the mirror; and a controller configured to control a display state, in the display, of an image acquired by the shooting, based on a state of a user on the front surface side of the mirror.

According to a second aspect of the present invention, there is provided a display control method executed by a display control apparatus comprising a mirror configured to project an optical reflection image onto a front surface thereof and transmit light from behind the mirror, and a display disposed behind the mirror, the method comprising: shooting a field of view on the front surface side of the mirror; and controlling a display state, in the display, of an image acquired by the shooting, based on a state of a user on the front surface side of the mirror.

According to a third aspect of the present invention, there is provided a non-transitory computer-readable storage medium which stores a program for causing a computer of a display control apparatus to execute a display control method, wherein the display control apparatus comprises: a mirror configured to project an optical reflection image onto a front surface thereof and transmit light from behind the mirror; and a display disposed behind the mirror, and wherein the display control method comprises: shooting a field of view on the front surface side of the mirror; and controlling a display state, in the display, of an image acquired by the shooting, based on a state of a user on the front surface side of the mirror.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
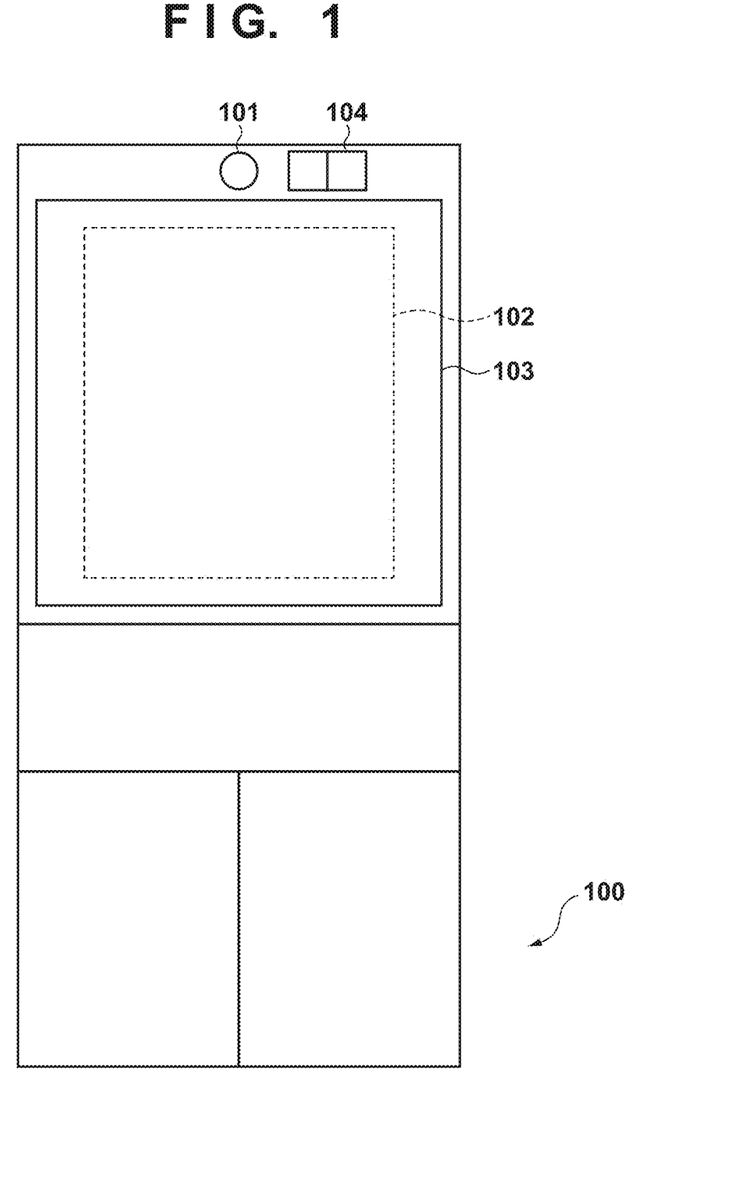
FIG. 1 is a diagram showing the external appearance of a mirror display 100, which is an example of a display control apparatus.

FIG. 1 is a diagram showing the external appearance of a mirror display 100, which is an example of a display control apparatus. The mirror display 100 takes the form of a bathroom vanity. The mirror display 100 includes a one-way mirror unit 103, and a display unit 102 is disposed behind the one-way mirror unit 103. An optical system 101 is constituted by lenses and the like, and causes an image capturing unit 105 described later to form an optical image of a subject (user, etc.) on a front surface of the mirror display 100. A gaze detection unit 104 detects the user's gaze. By standing in front of the mirror display 100, the user is able to check his or her own reflection image that appears on the one-way mirror unit 103, or check video of himself or herself taken by the optical system 101 and displayed on the display unit 102. Also, the display state of the display unit 102 is controlled based on the user's gaze detected by the gaze detection unit 104.

Figure 2:
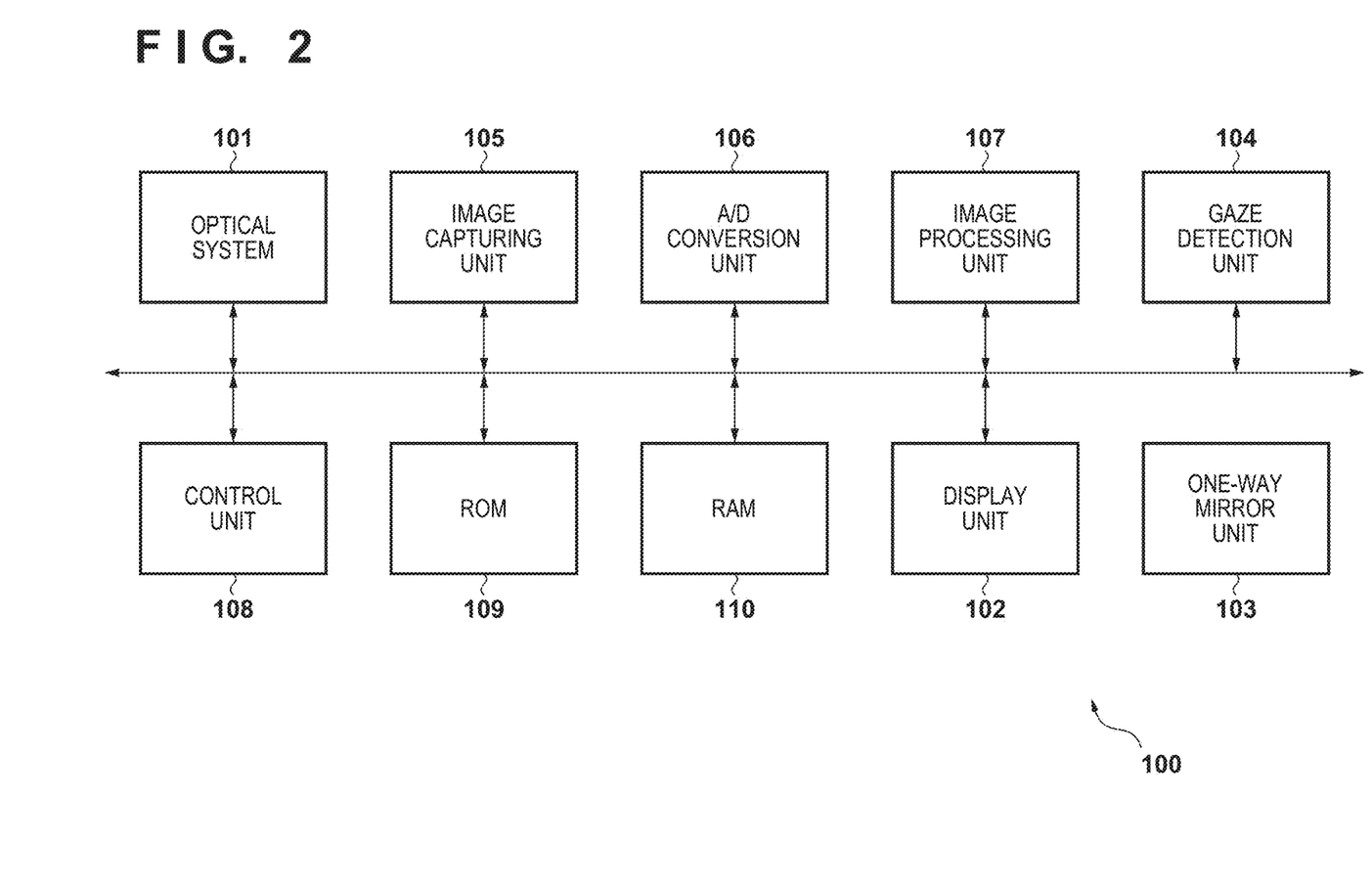
FIG. 2 is a block diagram showing the configuration of the mirror display 100.

FIG. 2 is a block diagram showing the configuration of the mirror display 100. A control unit 108 is, for example, a CPU. The control unit 108 controls the operations of the various blocks provided in the mirror display 100, by reading out a program for controlling the operations of the various blocks provided in the mirror display 100 from a ROM 109 and unpacking and executing the program in a RAM 110. The ROM 109 is a rewritable non-volatile memory, and stores parameters etc. required in the operations of the respective blocks provided in the mirror display 100, in addition to the program for controlling the operations of the respective blocks. The RAM 110 is a rewritable volatile memory, and is used as a temporary storage area for data output in the operations of the respective blocks provided in the mirror display 100.

The optical system 101 causes the image capturing unit 105 to form an optical image of a subject such as the user on the front of the mirror display 100. The image capturing unit 105 includes an image sensor such as a CCD sensor, CMOS sensor, or the like. The image capturing unit 105 generates an analog image signal by photoelectrically converting the optical image formed in the image sensor by the optical system 101, and outputs the generated analog image signal to an A/D conversion unit 106. Accordingly, the image capturing unit 105 is able to shoot a field of view on the front surface side of the one-way mirror unit 103.

The A/D conversion unit 106 converts the input analog image signal into digital image data, by applying A/D conversion processing to the analog image signal. The A/D conversion unit 106 outputs and saves the digital image data to the RAM 110. The image data stored in the RAM 110 is input to an image processing unit 107. In the image processing unit 107, the image data undergoes processing such as color conversion, white balance, and gamma correction, and is converted into a YCrCb signal (luminance signal and color difference signal).

The display unit 102 displays content such as image data generated by the image processing unit 107. The one-way mirror unit 103 is configured to project an optical reflection image onto the front surface thereof and transmit light from behind the one-way mirror unit 103. Accordingly, in a state where the display unit 102 is off or displaying black, the one-way mirror unit 103 projects an optical reflection image of the user or the like standing in front thereof. On the other hand, in a state where the display unit 102 is displaying content such as a shot image, the one-way mirror unit 103 transmits and displays the content being displayed by the display unit 102.

The gaze detection unit 104 has a near-infrared camera and a near-infrared LED. The gaze detection unit 104 detects the pupil center and a Purkinje image illuminated by the near-infrared LED from an image of the user's eyeball taken by the near-infrared camera and detects the user's gaze from the positional relationship therebetween. Furthermore, the gaze detection unit 104 detects where on the mirror display 100 the user is looking from the detected gaze. Known techniques may be used for gaze detection and gaze point detection.

Figure 4:
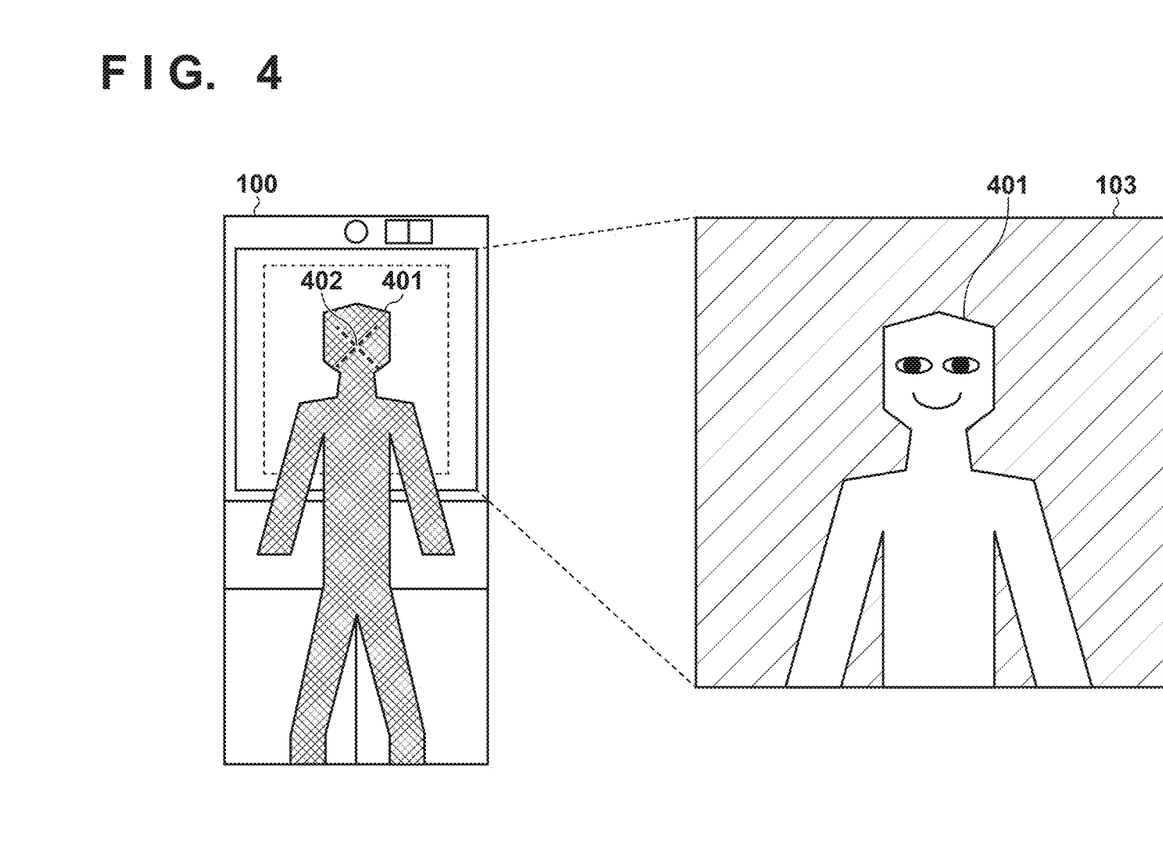
FIG. 4 shows a user 401 standing in front of the mirror display 100.

FIG. 4 is a diagram showing a user 401 standing in front of the mirror display 100. In FIG. 4, an optical reflection image of the user 401 is projected onto the one-way mirror unit 103. A gaze point 402 is the gaze point of the user 401 detected by the gaze detection unit 104. In FIG. 4, the gaze of the user 401 is focused near the center of the one-way mirror unit 103.

Figure 3:
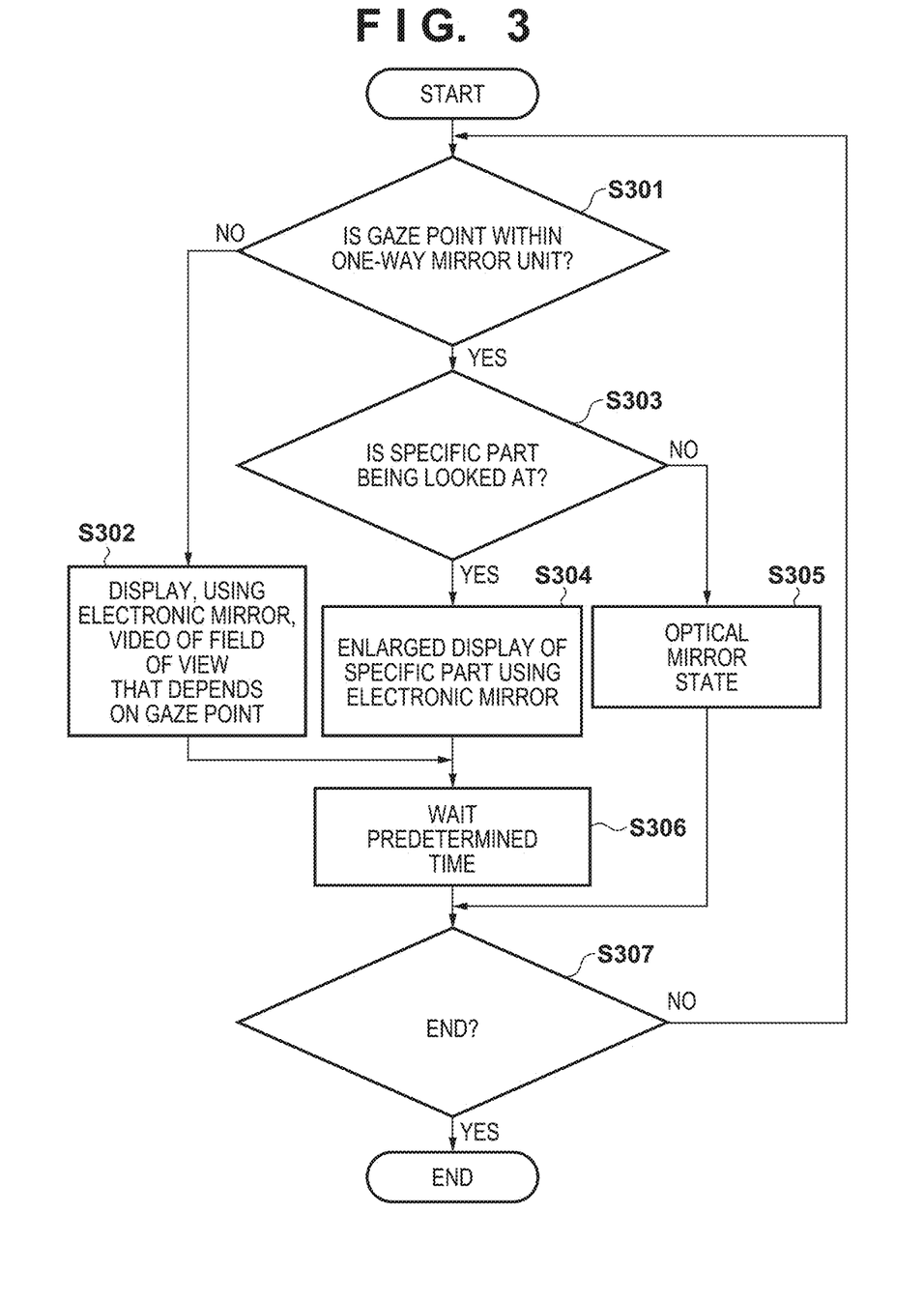
FIG. 3 is a flowchart illustrating operations of the mirror display 100.

FIG. 3 is a flowchart illustrating operations of the mirror display 100. Unless otherwise specified, the processing of the steps of the flowchart is realized by the control unit 108 executing a program stored in the ROM 109.

In step S301, the control unit 108 determines whether the user 401 is looking into the one-way mirror unit 103, which is an optical mirror, based on the gaze point of the user 401 (example of a state relating to the user's viewpoint) detected by the gaze detection unit 104. If the user 401 is looking into the one-way mirror unit 103, the processing proceeds to step S303, and if not (if the user 401 is looking outside the one-way mirror unit 103), the processing proceeds to step S302.

In step S302, the control unit 108 controls the display unit 102 to display video of a field of view that depends on the gaze point of the user 401. Two examples relating to the processing of step S302 will now be described, with reference to FIGS. 5 and 6.

Figure 5:
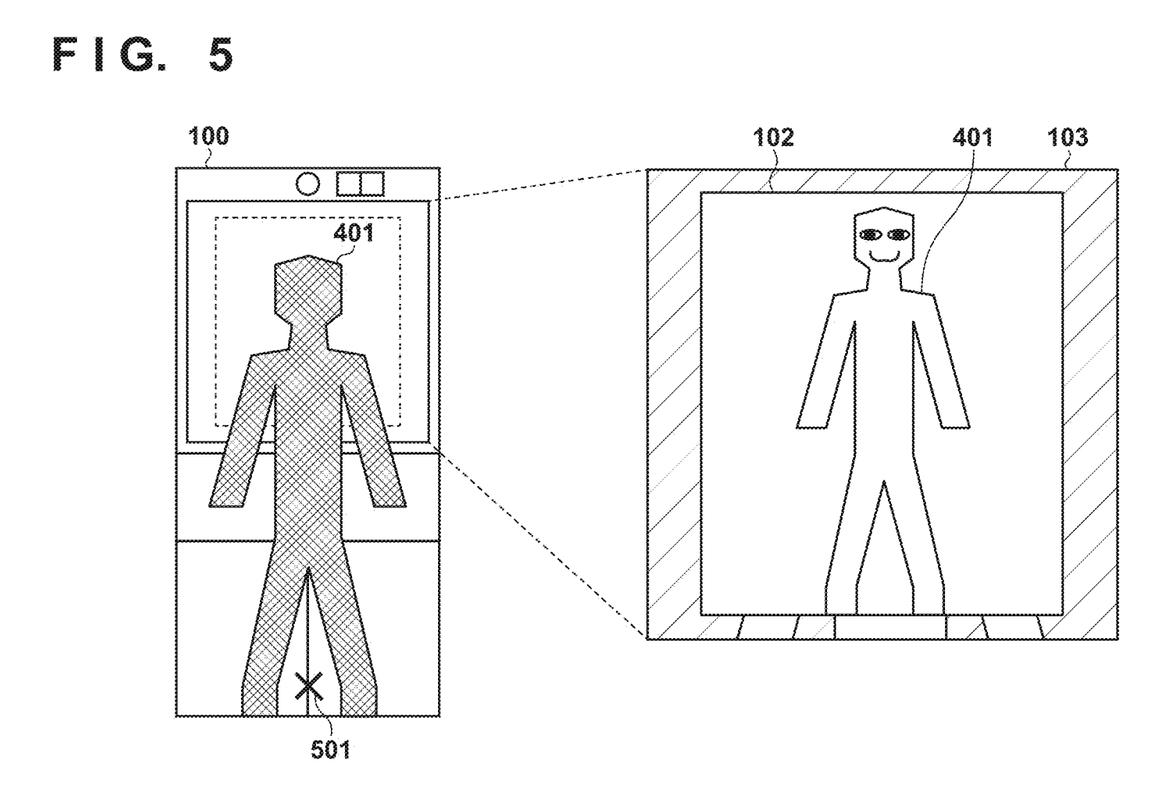
FIG. 5 is a diagram showing an example of a state in which the user 401 is looking outside the one-way mirror unit 103.

FIG. 5 is a diagram showing an example of a state in which the user 401 is looking outside the one-way mirror unit 103. A gaze point 501 is the gaze point of the user 401 detected by the gaze detection unit 104. If the one-way mirror unit 103 extended as far as the position of the gaze point 501, the feet of the user 401 would be projected onto the one-way mirror unit 103 as an optical reflection image. However, the actual one-way mirror unit 103 is only able to project the upper body of the user 401. If the user 401 is looking at the gaze point 501, the user 401 conceivably wants to check his or her whole body including the feet. In view of this, the control unit 108 controls the display unit 102 to display video corresponding to a field of view that includes the whole body of the user 401 shot by the image capturing unit 105.

Figure 6:
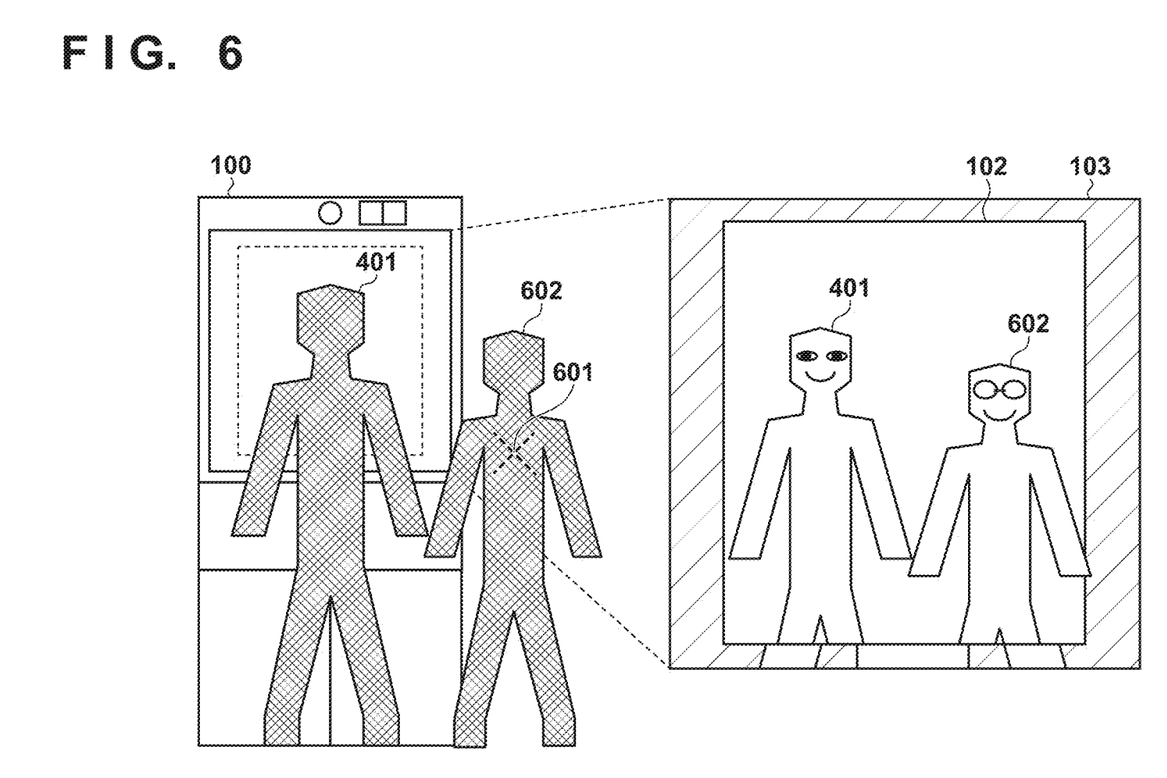
FIG. 6 is a diagram showing another example of a state in which the user 401 is looking outside the one-way mirror unit 103.

FIG. 6 is a diagram showing another example of a state in which the user 401 is looking outside the one-way mirror unit 103. A gaze point 601 is the gaze point of the user 401 detected by the gaze detection unit 104. If the one-way mirror unit 103 extended as far as the position of the gaze point 601, a companion 602 standing to the right of the user 401 would be projected onto the one-way mirror unit 103 as an optical reflection image. However, the actual one-way mirror unit 103 is only able to project the upper body of the user 401. If the user 401 is looking at the gaze point 601, the user 401 conceivably wants to check what he or she looks like next to the companion 602. In view of this, the control unit 108 controls the display unit 102 to display video corresponding to a field of view that includes both the user 401 and the companion 602 shot by the image capturing unit 105.

As shown in these examples, the control unit 108 uses the display unit 102 as an electronic mirror and is able to control the display unit 102 to display video having a wider field of view to include regions that do not appear as a reflection image on the one-way mirror unit 103. By using the display unit 102 disposed behind the one-way mirror unit 103 as an electronic mirror in this way, the mirror function of the one-way mirror unit 103 can be extended and convenience for the user 401 can be enhanced.

After the processing of step S302, the control unit 108, in step S306, waits for a predetermined time (e.g., 30 seconds). Since the processing for waiting for a predetermined time is thus performed, the electronic mirror display started in step S302 continues for a predetermined time (i.e., shot image continues to be displayed on the display unit 102 for a predetermined time), even if the gaze point of the user 401 moves after the processing of step S302. Accordingly, even if, for example, the user 401 looks into the display unit 102 disposed in an inner part of the one-way mirror unit 103 after looking at the gaze point 501, the display unit 102 continues to display the full-body image of the user 401 for the predetermined time. Thus, the user 401 is able carefully observe his or her own full-body image.

If it is determined in step S301 that the user 401 is looking into the one-way mirror unit 103, the control unit 108, in step S303, determines whether the user 401 is looking at a specific part of himself or herself within the one-way mirror unit 103. If the user 401 is looking at a specific part, the processing proceeds to step S304, and, if not, the processing proceeds to step S305. The specific part is not particularly limited, and, for example, the left/right eye, the mouth and the like can be used as the specific part.

In step S304, the control unit 108 controls the display unit 102 to display the specific portion that the user 401 is looking at in an enlarged manner. An example of the processing of step S304 will now be described, with reference to FIG. 7.

Figure 7:
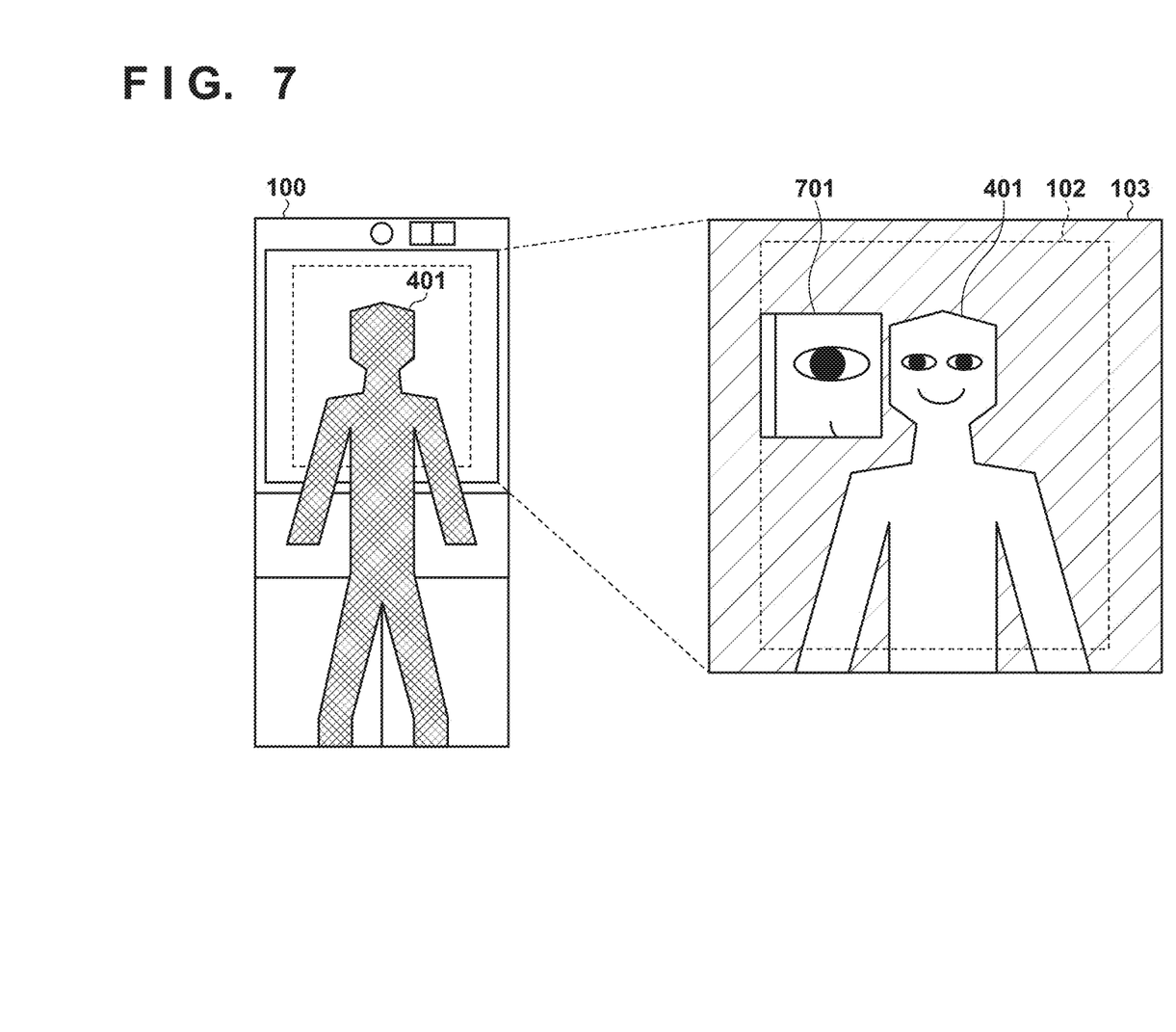
FIG. 7 is a diagram showing the user 401 looking at his or her left eye in an optical image of himself or herself projected onto the one-way mirror unit 103.

FIG. 7 is a diagram showing the user 401 looking at his or her left eye in an optical image projected onto the one-way mirror unit 103. The control unit 108 controls the display unit 102 to display the left eye of the user 401 in an enlarged manner inside a region 701 of the display unit 102, such that the left eye of the user 401 is displayed larger. Note that the control unit 108 controls the display unit 102 to display the region outside the region 701 to be black. Thus, the optical reflection image continues to be projected in a region of the one-way mirror unit 103 that does not overlap with the region 701. That is, the user 401 can view the optical reflection image that appears in the region of the one-way mirror unit 103 corresponding to the region (region other than partial region) that does not overlap with the region 701 (partial region of display unit 102). If the user 401 wants to check the specific part in detail using the one-way mirror unit 103, which is an optical mirror, he or she needs to move closer to the optical mirror, but doing so is troublesome since this may mean having to get into an awkward position or fogging the mirror with his or her breath. According to the present embodiment, the mirror function of the one-way mirror unit 103 can be extended by displaying the part that the user 401 is looking at in an enlarged manner with an electronic mirror, and convenience for the user 401 can be enhanced. The enlargement ratio of the enlarged display may be fixed. In this case, the processing load of the control unit 108 is reduced. Alternatively, factors such as an appropriate enlargement ratio differing because of the size of the eyes being different from the mouth, for example, and the preferred enlargement ratio being affected by differences in age and between individuals may be taken into consideration. Accordingly, the control unit 108 may change the enlargement ratio, according to the type of specific part that the user 401 is looking at, the age of the user 401, who the user 401 is, and the like.

After the processing of step S304, the control unit 108, in step S306, waits for a predetermined time (e.g., 30 seconds), similarly to when the processing of step S302 is performed.

If it is determined in step S301 that the user 401 is not looking at a specific part (e.g., the user 401 is vaguely looking into the one-way mirror unit 103, looking around the whole mirror, etc.), the processing of step S305 is performed. In step S305, the control unit 108 switches the one-way mirror unit 103 to an optical mirror state, by turning off the display unit 102 (or causing the display unit 102 to display black).

In step S307, the control unit 108 determines whether to end the processing. For example, when an operation to power off the mirror display 100 is performed, the control unit 108 determines to end the processing. If it is determined to end the processing, the processing of this flowchart ends. If it is not determined to end the processing, the processing returns to step S301.

In this way, in the example of FIG. 3, the control unit 108 controls the display state of the display unit 102, based on the user's gaze point detected by the gaze detection unit 104. Here, the user's gaze point is an example of the state of the user, and, generally speaking, the control unit 108 controls the display state of the display unit 102 based on the state of the user.

The state of the user in the present embodiment is not limited to the gaze point, and may be any of various states including the gaze point or any combination thereof. Hereinafter, various examples of the state of the user will be described.

For example, the control unit 108 may detect the orientation of the user's face, by performing processing such as organ detection on the user's face shot by the image capturing unit 105. In this case, for example, the control unit 108, in step S301, may advance the processing to step S303 if the user's face is facing the front, and may advance the processing to step S302 if the user's face is not facing the front. In this way, the state of the user may include states relating to the orientation of the user's face.

Also, in the above description, the control unit 108, in step S303 of FIG. 3, determines whether the user 401 is looking at a specific part, but the present embodiment is not limited to this configuration. For example, in step S303, the control unit 108 may determine whether the user has pointed to a specific part with his or her finger, based on an image of the user shot by the image capturing unit 105. If the user points to a specific part with his or her finger, the processing proceeds to step S304, and, if not, the processing proceeds to step S305. In this way, the state of the user may include a state relating to an instruction given by the user with his or her finger.

Also, in the above description, the control unit 108, in step S301 of FIG. 3, determines whether the user is looking into the one-way mirror unit 103, but the present invention is not limited to such a configuration. For example, the control unit 108 may determine whether the user is looking within a predetermined region. For example, in the case where the mirror display 100 takes the form of a bathroom vanity as shown in FIG. 1, there are faucets, a place for toothbrushes, and the like immediately below the one-way mirror unit 103. If the user is looking at the faucets or the like, he or she could possibly want to maintain the optical mirror state. In view of this, a region obtained by slightly extending the region of the one-way mirror unit 103 in the downward direction may be set as a predetermined region. In this case, when the user is looking at the faucets, the optical mirror state is maintained since the gaze point is inside the predetermined region. Also, in the case of a mirror display that users may sit down to use, such as a mirror dresser installed in a home or in the cosmetics section of a department store, the user is unable see his or her feet when sitting, and thus the display unit 102 does not need to display a full-body image. Thus, the control unit 108 may determine whether the user is sitting, based on video of the user shot by the image capturing unit 105, and change whether or not to extend the predetermined area downward depending on whether the user is sitting or standing. If the user is sitting, the control unit 108 may perform control such that switching to full-body image display effectively does not occur when the user is sitting, by setting a region obtained by greatly extending the region of the one-way mirror unit 103 in the downward direction as the predetermined region. In this way, the state of the user may also include a state relating to whether the user is standing or sitting.

Also, in the above description, the control unit 108, in step S303 of FIG. 3, determines whether the user is looking at a specific part of his or her own optical reflection image, but may additionally determine whether the user is performing a specific activity registered in advance such as brushing teeth or putting on makeup. For example, even if the user is looking at a specific part, the control unit 108 advances the processing to step S305 rather than to step S304, in the case where the user is not performing a specific activity. By employing such a configuration, it is possible to avoid excessively performing enlarged display of a specific part contrary to the user's intention. In this way, the state of the user may include a state relating to the user's activity.

Note that, in the present embodiment, control is performed for displaying video of a field of view that depends on the user's gaze point with an electronic mirror in step S302 of FIG. 3, and for displaying a specific part in an enlarged manner with an electronic mirror in step S304. In order to realize this control, a configuration may be adopted in which the optical system 101 can be panned/tilted or the focal length of the optical system 101 can be changed. Alternatively, a configuration may be adopted in which video is cropped by image processing to realize electronic panning/tilting, electronic zoom and the like, without changing the state of the optical system 101.

Also, in steps S302, S304, and S305, the control unit 108 may instantly transition the display state of the display unit 102 or may transition the display state following a visual effect such as zoom in, zoom out, or slide.

Also, the mirror display 100 in FIG. 1 is assumed to be generally used inside buildings such as with a bathroom vanity, but the present embodiment is not limited to such a configuration. For example, the technology of the mirror display 100 described above may be applied to an in-vehicle apparatus such as a rearview mirror or sun visor mirror of a car. Many users utilize sun visor mirrors for makeup and the like, but since the space inside a car is more confined than at home, utilization in applications such as checking one's attire has been difficult. According to the present embodiment, it becomes possible to display the upper body and the like in addition to the face with an electronic mirror in the confines of a car, without any manual operations, and convenience for the user can be improved.

As described above, according to the present embodiment, the mirror display 100 is provided with the one-way mirror unit 103 and the display unit 102 disposed behind the one-way mirror unit 103. Also, the control unit 108 of the mirror display 100 shoots the field of view on the front surface side of the one-way mirror unit 103, using the image capturing unit 105. The control unit 108 detects the state of the user on the front surface side of the one-way mirror unit 103. The state of the user includes, for example, the user's gaze point (state relating to the user's gaze). In this case, the control unit 108 detects the user's gaze point, using the gaze detection unit 104. The control unit 108 then controls the display state, in the display unit 102, of the image acquired by shooting, based on the state of the user (e.g., whether the user's gaze point is inside the one-way mirror unit 103). Examples of control of the display state, in the display unit 102, of the image acquired by shooting include control for achieving a state in which an image is displayed on the display unit 102 (e.g., step S302 or step S304 in FIG. 3), and control for achieving a state in which an image is not displayed on the display unit 102 (e.g., step S305 in FIG. 3).

For example, the control unit 108 performs control such that an image acquired by shooting is displayed on the display unit 102, following a determination that the user is in a state in which his or her attention is directed outside a predetermined region that is based on the region of the one-way mirror unit 103. The state in which the user's attention is directed outside a predetermined region that is based on the region of the one-way mirror unit 103 is, for example, a state in which the user's gaze point is outside the one-way mirror unit 103. Also, for example, the control unit 108 performs control such that an image acquired by shooting is not displayed on the display unit 102, following a determination that the user is in a state in which his or her attention is directed inside a predetermined region that is based on the region of the one-way mirror unit 103. The state in which the user's attention is directed inside a predetermined region that is based on the region of the one-way mirror unit 103 is, for example, a state in which the user's gaze point is inside the one-way mirror unit 103.

Accordingly, with the present embodiment, the display state of the display unit 102 is controlled based on the state of the user, and the user does not need to perform button operations or the like, thus enabling the burden on the user relating to controlling the display state of the display unit 102 to be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-137398, filed Aug. 25, 2023, which is hereby incorporated by reference herein in its entirety.

What is claimed is:

1. A display control apparatus comprising:
a mirror configured to project an optical reflection image onto a front surface thereof and transmit light from behind the mirror;
a display disposed behind the mirror;
an image sensor configured to shoot a field of view on the front surface side of the mirror; and
a controller configured to control a display state, in the display, of an image acquired by the shooting, based on a state of a user on the front surface side of the mirror,
wherein the state of the user includes at least one of a state relating to a gaze of the user, a state relating to an orientation of the user's face, a state relating to an instruction given by a finger of the user, a state relating to whether the user is standing or sitting, and a state relating to an activity of the user.

2. The display control apparatus according to claim 1,
wherein the controller performs control such that the image is displayed on the display, in a case where the state of the user is a first state.

3. The display control apparatus according to claim 2,
wherein the first state is a state in which the user's attention is directed outside a predetermined region that is based on a region of the mirror.

4. The display control apparatus according to claim 2,
wherein the controller, after performing control such that the image is displayed on the display, performs control such that a state in which the image is displayed on the display is continued for a predetermined time, regardless of whether the state of the user is maintained in the first state.

5. The display control apparatus according to claim 2,
wherein the controller:
in a case where the state of the user is the first state, performs control such that a first image corresponding to a first field of view on the front surface side of the mirror acquired by the shooting is displayed on the display; and
in a case where the state of the user is a second state, performs control such that a second image corresponding to a second field of view on the front surface side of the mirror acquired by the shooting is displayed on the display.

6. The display control apparatus according to claim 1,
wherein the controller, in a case where the state of the user is a third state in which the user's attention is directed to a specific part of the user, performs control such that a third image corresponding to the specific part acquired by the shooting is displayed on the display in an enlarged manner.

7. The display control apparatus according to claim 6,
wherein the controller, in a case where the state of the user is the third state, performs control such that the third image is displayed in an enlarged manner in a partial region of the display, such that the optical reflection image projected onto a region of the mirror corresponding to a region of the display other than the partial region is viewable by the user.

8. The display control apparatus according to claim 6,
wherein the controller changes an enlargement ratio of the third image, according to at least one of a type of the specific part and an age of the user.

9. The display control apparatus according to claim 6,
wherein the third state is a state in which the user's attention is directed to the specific part of the user and the user is performing a specific activity.

10. The display control apparatus according to claim 1,
wherein the controller, in a case where the state of the user is a fourth state, performs control such that the image is not displayed on the display.

11. The display control apparatus according to claim 10,
wherein the fourth state is a state in which the user's attention is directed inside a predetermined region that is based on the region of the mirror.

12. The display control apparatus according to claim 1,
wherein the controller:
in a case where the state of the user is a first state, performs control such that a first image corresponding to a first part of the user is displayed on the display; and
in a case where the state of the user is a second state, performs control such that a second image corresponding to a second part of the user is displayed on the display.

13. The display control apparatus according to claim 12,
wherein the first part and the second part are different from each other.

14. The display control apparatus according to claim 1,
wherein the controller:
in a case where the state of the user is a first state, performs control such that a first image corresponding to an upper body of the user is displayed on the display; and
in a case where the state of the user is a second state, performs control such that a second image corresponding to a whole body of the user is displayed on the display.

15. A display control method executed by a display control apparatus comprising a mirror configured to project an optical reflection image onto a front surface thereof and transmit light from behind the mirror, and a display disposed behind the mirror, the method comprising:
shooting a field of view on the front surface side of the mirror; and
controlling a display state, in the display, of an image acquired by the shooting, based on a state of a user on the front surface side of the mirror,
wherein the state of the user includes at least one of a state relating to a gaze of the user, a state relating to an orientation of the user's face, a state relating to an instruction given by a finger of the user, a state relating to whether the user is standing or sitting, and a state relating to an activity of the user.

16. A non-transitory computer-readable storage medium which stores a program for causing a computer of a display control apparatus to execute a display control method,
wherein the display control apparatus comprises:
a mirror configured to project an optical reflection image onto a front surface thereof and transmit light from behind the mirror; and
a display disposed behind the mirror, and
wherein the display control method comprises:
shooting a field of view on the front surface side of the mirror; and
controlling a display state, in the display, of an image acquired by the shooting, based on a state of a user on the front surface side of the mirror,
wherein the state of the user includes at least one of a state relating to a gaze of the user, a state relating to an orientation of the user's face, a state relating to an instruction given by a finger of the user, a state relating to whether the user is standing or sitting, and a state relating to an activity of the user.

* * * * *